United States Patent

[11] 3,565,136

[72] Inventor Francis J. Rosenthal, Jr.
 Fork, Md.
[21] Appl. No. 817,846
[22] Filed Apr. 21, 1969
[45] Patented Feb. 23, 1971
[73] Assignee The Black and Decker Manufacturing Company
 Towson, Md.

[54] DEPTH OF CUT ADJUSTMENT CONSTRUCTION FOR A RADIAL-ARM SAW
 13 Claims, 6 Drawing Figs.
[52] U.S. Cl. .................................................. 143/6;
 143/43
[51] Int. Cl. .................................................. B27b 5/20
[50] Field of Search .......................................... 143/6—1,
 6—43, 43—1.5, 43—6.5; 83/471

[56] References Cited
 UNITED STATES PATENTS
 108,886 11/1870 Curell ..........................

| 1,815,037 | 7/1931 | De Walt | 143/6 |
| 2,543,486 | 2/1951 | Briskin | 143/43 |
| 2,630,146 | 3/1953 | Van Tuyl | 143/6 |
| 2,987,083 | 6/1961 | Ross et al. | 143/6 |

Primary Examiner—Donald R. Schran
Attorneys—Leonard Bloom and Joseph R. Slotnik

ABSTRACT: The device disclosed herein is a radial-arm saw including a base frame having a horizontal worktable thereon. A one-piece, column and radial arm is pivoted on the base frame for movement about a generally vertical axis with the arm extending over the worktable. A motor-driven circular saw is suspended from the radial arm by a carriage which allows the saw to move along the arm and cut a workpiece on the worktable. Novel means is provided whereby the elevation of the saw blade relative to the worktable may be varied to thereby change the depth of cut performed by the saw blade on the workpiece.

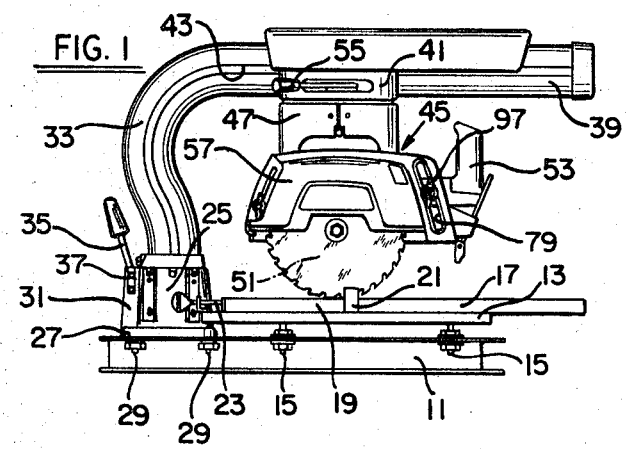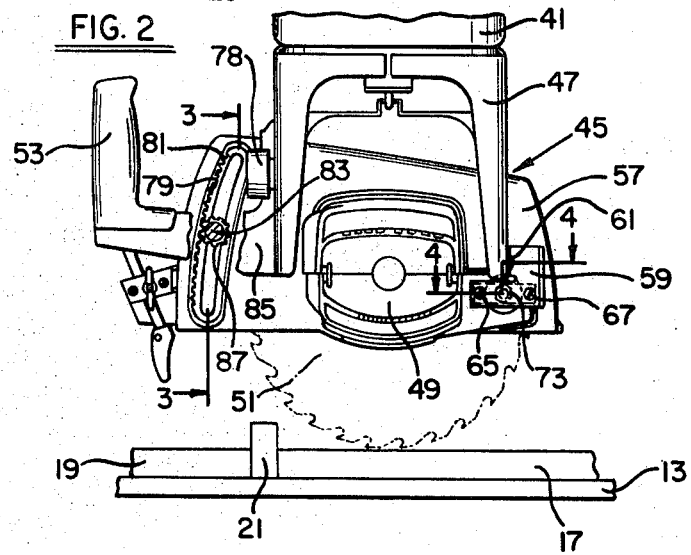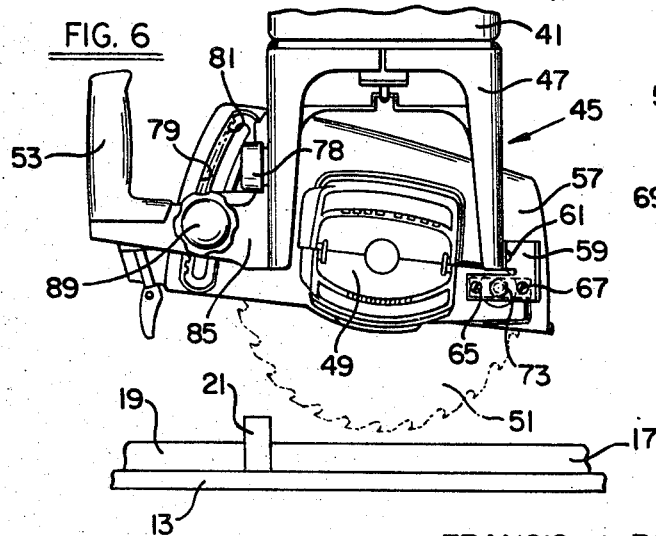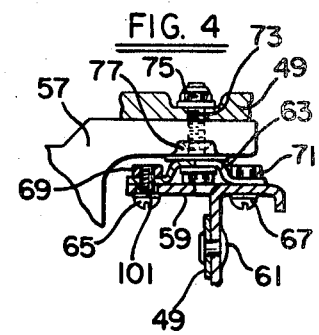

PATENTED FEB 23 1971
3,565,136
SHEET 2 OF 2
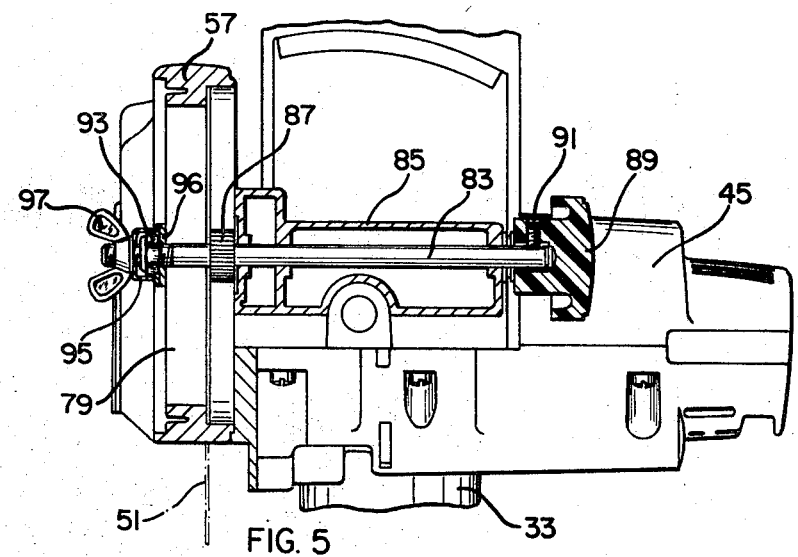
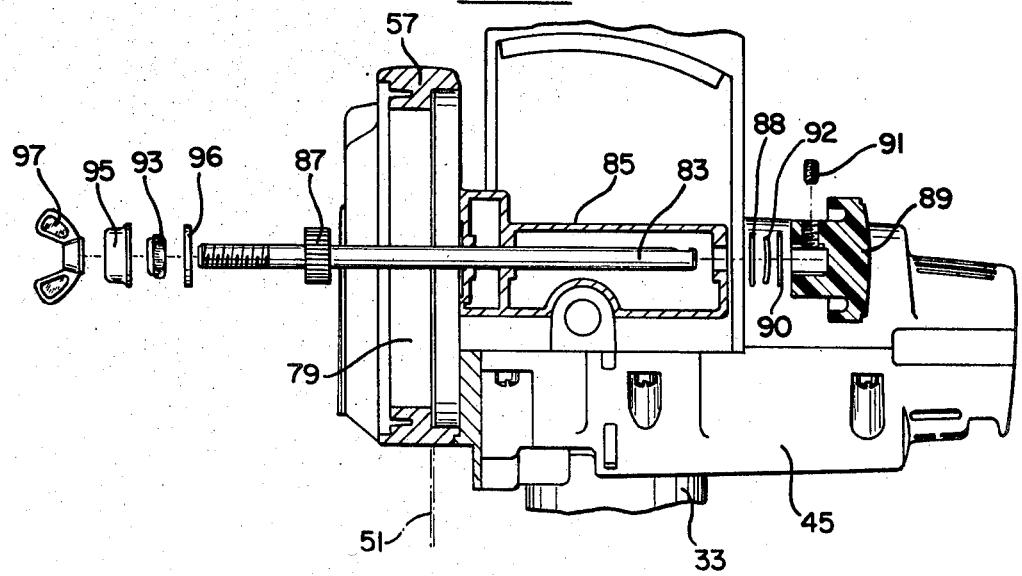
INVENTOR
FRANCIS J. ROSENTHAL, JR.
BY *Joseph R. Slotnik*
ATTORNEY 3,565,136

1

DEPTH OF CUT ADJUSTMENT CONSTRUCTION FOR A RADIAL-ARM SAW

SUMMARY OF THE INVENTION

The present invention is directed to a simple and effective saw elevating mechanism for a radial-arm saw. This mechanism is operable by means disposed for ready accessibility by the operator and requires that a minimum of saw component parts undergo elevation. Furthermore, the elevating mechanism itself involves a minimum of parts and obviates the need for close manufacturing tolerances.

Main objects of the present invention, therefore, are to provide a novel elevating mechanism for a radial-arm saw which embodies simplicity of design, is positive in operation, eliminates close tolerances, and which overall is effective in performance.

Further important objects of the present invention are to provide a novel elevating mechanism of the above character which is operable by means readily accessible to the operator and, during use, involves elevation of a minimum of parts.

Additional important objects are to provide a novel mechanism of the above character which is relatively inexpensive to manufacture, rugged in construction, and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a radial-arm saw construction embodying the present invention;

FIG. 2 is an enlarged view illustrating the saw and elevating mechanism of FIG. 1 from the reverse side thereof;

FIG. 3 is an enlarged sectional view of FIG. 2 taken along the line 3—3 thereof;

FIG. 4 is an enlarged sectional view of FIG. 2 taken along the line 4—4 thereof;

FIG. 5 is a view similar to FIG. 3 but showing the parts exploded; and

FIG. 6 is a view similar to FIG. 2 and showing the parts in another elevated position.

BROAD STATEMENT OF THE INVENTION

Broadly described, the present invention relates to a radial-arm saw comprising a base having a horizontal worktable supported thereon, column and arm means extending upwardly from said base and over said worktable, respectively, carriage means including a frame movable along said arm means, circular saw means pivoted upon said frame for movement about a horizontal axis and movable with said carriage means to cut a workpiece on said table, means for pivoting said saw means relative to said frame to adjust the elevation of said saw means relative to said carriage means whereby to adjust the depth of cut performed by said saw means on said work piece, said elevation adjusting means comprising a rack and pinion on said saw means and frame, respectively, a shaft rotatable on said frame and rigid with said pinion, resilient means between said shaft and said frame, first torque means adapted to deform said resilient means a first predetermined amount to develop a first predetermined frictional force on said shaft, and second torque means independent of said first torque means and adapted to deform said resilient means a second predetermined amount whereby to prevent turning movement of said shaft.

In another aspect, the present invention relates to a radial-arm of the type having a swivel arm supported in cantilever fashion over and parallel to a horizontal worktable, saw means movable along said arm, the improvement in said radial-arm saw wherein said saw means comprises a frame having an electric motor and saw unit pivoted by pivot means on said frame about a generally horizontal axis, rack and pinion means

2 mounted on said motor and saw unit and said frame for adjusting the pivoted position of said motor and saw unit, said pivot means being adjustable in a plane generally perpendicular to said horizontal axis, whereby to compensate for tolerance variations between said rack and pinion, and means releasably locking said motor and saw unit to said frame in selected pivotally adjusted positions.

DETAILED DESCRIPTION

Referring now specifically to the drawings, a radial-arm saw construction embodying the present invention is seen in FIG. 1 to include base frames 11 having a pair of cleats 13 (only one of which is shown) secured thereto by fasteners 15. A worktable has a stationary portion 17 secured to the cleats 13 in a suitable fashion and a removable portion 19 held against a work fence 21 by a plurality of clamps 23 (only one of which is shown).

A column support or collar 25 has a radial flange 27 secured atop the base frame 11 by fasteners 29. The collar 25 is generally cylindrical in cross section and is split along a major portion of its length and has a pair of confronting radial flanges 31 (only one of which is shown) formed at the split edges. A column 33 extends upwardly from the base frame 11 and has its lower end supported in the collar 25. The column 33 is adapted to be locked in place within the split collar 25 or released for pivoting or swivel action therein by drawing up on or releasing the flanges 31 which, in turn, changes the internal dimension of the collar 25 accordingly. To this end, a clamp lever 35 extends through the flanges 31 and is threaded into a trapped nut 37 so that by turning the lever in one direction or the other, the column 33 is locked or released, respectively.

A radial arm 39, formed integral or otherwise rigid with the column 33, extends over the worktable in cantilever fashion. A carriage 41 is supported for movement along the arm 39 by linear ball bearings (not shown) which ride in grooves or bearing races 43 (only one of which is shown) formed in the arm 39. A circular saw assembly 45 is suspended from the carriage 41 and includes a frame or yoke 47 which is adapted to swivel about a generally vertical axis relative to the carriage 41 to accommodate "crosscutting" and "ripping." The yoke 47, in turn, supports an electric motor positioned within a housing 49 and a circular blade 51, the latter being adapted to cut a workpiece (not shown) positioned on the worktable.

Thus, during "crosscutting," the saw assembly 45 is drawn across the worktable by means of a handle 53 whereas during "ripping," the saw assembly 45 is swiveled 90° relative to the position shown and locked and the workpiece (not shown) is moved past the blade 51 and along the fence 21. A locking lever 55 on the carriage provides for locking the saw assembly 45 in the crosscutting and ripping positions and for releasing this assembly for movement from one of these positions to the other.

Novel means is provided to adjust the elevation of the saw blade 51 relative to the worktable whereby to vary the depth of cut performed by the blade 51. As shown in FIGS. 2 and 6, the motor housing 49 has a saw guard 57 rigid therewith and which encompasses substantially the upper portion of the saw blade 51. A generally L-shaped main pivot bracket 59 is secured to the yoke 47 by a rivet 61 and is attached to an adjustment bracket 63 by a pair of bolts 65, 67 and nuts 69, 71 (see FIG. 4). The rigid saw guard 57 and motor housing 49 are pivotally secured at one end by a volt 73, a nut 75, and an intervening, cup-shaped washer 77 to the adjustment bracket 63 for movement about a horizontal axis so that the saw assembly 45 can pivot vertically. The rivet 61 provides another pivot whereby the saw guard 57 and motor housing 49 can be adjusted for bevel cutting. A knob 78 provides for selectively releasing and locking the guard 57 and housing 49 in adjusted, bevel cutting positions relative to the yoke 47.

As shown in FIGS. 2, 3, 5 and 6, the other end of the saw guard 57 is provided with an elongated arcuate slot 79 which has an arcuate gear rack 81 suitably fixed therein. A shaft 83 extends through a handle mounting yoke 85 rigid with the frame 47 and through the arcuate slot 79 and has a pinion 87 pressed thereon which meshes with the gear rack 81. A knob 89 is secured at one end of the shaft by a setscrew 91 and is spaced from the yoke 85 by flat washers 88, 90 and a belleville washer 92. Thus, when the knob 89 is turned, cooperation between the pinion 87 and rack 81 causes the saw assembly 45 to pivot up or down about the pivot bolt 73.

Means is provided to frictionally retain the saw assembly 45 in any adjusted position and whereby the saw assembly may be quickly and easily locked in this or any position. As shown in FIGS. 3 and 5, a prevailing torque nut 93 is threaded on the shaft 83 adjacent the other end thereof from the knob 89 and bears against a plastic washer 96 seated against the saw guard 57. A wing nut 97 is threaded on the shaft 83 outside the nut 93 and engages a cup-shaped washer 95. The washer 95 encases the prevailing torque nut 93 and bears against the plastic washer 96.

In assembly, the prevailing torque nut 93 is tightened to partially compress the belleville washer 92. The axial load on the torque nut 93 acts on the shaft 83 so that the saw assembly 43 is frictionally retained in any vertically adjusted position. However, the elevation of the saw assembly 43 may be changed or adjusted by turning the knob 89. This, in turn, causes the shaft 83 to turn and through meshing engagement between the pinion 87 and rack 81, the saw assembly 45 is raised or lowered about the pivot 73.

When the desired elevation is attained, the saw assembly 45 is locked in place by tightening down on the wing nut 97. This presses the cup-shaped washer 95 against the plastic washer 96 and transfers the load from the torque nut 93 to the wing nut 97 whereby the belleville washer 92 is fully compressed and the shaft 83 is locked in place. It will be appreciated that both the knob 89 and the wing nut 97 are readily accessible by the operator for quick and easy adjustment of the saw assembly 43.

As described briefly above, the saw assembly elevating mechanism is constructed to accommodate small tolerance variations and yet provide for smooth and efficient operation. To this end, the pivot bracket 59 has enlarged openings 101 (only one of which is shown) through which the bolts 65, 67 extend so that the pivot axis of the saw assembly 43 can be shifted laterally (See FIG. 4). Thus, with the parts assembled and with the bolts 65, 67 snug but not fully tightened, the knob 89 is turned so that the pinion 87 moves from one end of the rack 81 to the other. When a smooth operation is achieved, bolts 65, 67 are tightened. This allows the pinion 87 and rack 81 to achieve a smooth operation without requiring a critical manufacturing tolerances that otherwise would be necessary.

By the foregoing, there has been provided a novel depth of cut adjustment construction for a radial-arm saw calculated to fulfill the inventive objects herein and while a preferred embodiment has been set out, various additions, substitutions, modifications and omissions may be made thereto without departing from the spirit of the invention as encompassed by the appended claims.

I claim:

1. A radial-arm saw comprising a base having a horizontal worktable supported thereon, column and arm means extending upwardly from said base and over said worktable, respectively, carriage means including a frame movable along said arm means, circular saw means pivoted upon said frame for movement about a horizontal axis and movable with said carriage means to cut a workpiece on said table, means for pivoting said saw means relative to said frame to adjust the elevation of saw means relative to said carriage means, whereby to adjust the depth of cut performed by said saw means on said workpiece, said elevation adjusting means comprising a rack and pinion on said saw means and frame, respectively, a shaft rotatable on said frame and rigid with said pinion, resilient means between said shaft and said frame, first torque means adapted to deform said resilient means a first predetermined amount to develop a first predetermined frictional force on said shaft, and second torque means independent of said first torque means and adapted to deform said resilient means a second predetermined amount, whereby to prevent turning movement of said shaft.

2. A construction as defined in claim 1 wherein said pivot means is adjustable in a plane generally perpendicular to said horizontal axis.

3. A construction as defined in claim 2 wherein said pivotally connecting means comprises interconnecting first and second brackets on said frame and said saw means, respectively.

4. A construction as defined in claim 3, said second bracket is pivoted on said saw means and is adjustable relative to said first bracket in a plane generally perpendicular to said horizontal axis.

5. A construction as defined in claim 1 wherein said resilient means includes belleville washer means, said first torque means includes a prevailing torque nut on said shaft and operatively engageable with said frame, said second torque means includes a manually manipulatable nut on said shaft and operatively engageable with said frame independently of said first torque means.

6. A construction as defined in claim 1 wherein said rack is arcuate in configuration and is formed on a radius from said pivot means.

7. In a radial-arm saw of the type having a swivel arm supported in cantilever fashion over and parallel to a horizontal worktable, saw means movable along said arm, the improvement in said radial arm saw wherein said saw means comprises a frame having an electric motor and saw unit pivoted by pivot means on said frame about a generally horizontal axis, rack and pinion mounted on said motor and saw unit and said frame for adjusting the pivoted position of said motor and saw unit, said pivot means being adjustable in a plane generally perpendicular to said horizontal axis, whereby to compensate for tolerance variations between said rack and pinion, and means releasably locking said motor and saw unit to said frame in selected pivotally adjusted positions.

8. A construction as defined in claim 7 wherein said pinion is fixed to a shaft rotatably supported upon said frame, and said releasable locking means locks said shaft against turning.

9. A construction as defined in claim 8 which includes friction means operable independently of said locking means to retard turning movement of said shaft.

10. A construction as defined in claim 9 wherein said friction means includes belleville washer means on said shaft, and torque means acting on said shaft and adapted to deflect said belleville washer means.

11. A construction as defined in claim 10 wherein said releasable locking means comprises another torque means acting on said shaft independently of said first-mentioned torque means and adapted to lock said shaft.

12. A construction as defined in claim 7 wherein said pivot means includes a pair of adjustably interconnected bracket members carried by said frame and said motor and saw unit, respectively.

13. A construction as defined in claim 12 wherein one of said bracket members is pivoted to said frame for movement about another horizontal axis generally perpendicular to said first-mentioned axis, whereby said motor and saw unit can be adjusted for bevel cutting.